(12) United States Patent
Chen

(10) Patent No.: US 8,308,405 B2
(45) Date of Patent: Nov. 13, 2012

(54) CUTTER HOLDER

(76) Inventor: Chin-Chiu Chen, Cingshuei Chen (TW)

( * ) Notice: Subject to any disclaimer, the term of this patent is extended or adjusted under 35 U.S.C. 154(b) by 782 days.

(21) Appl. No.: 12/460,735

(22) Filed: Jul. 23, 2009

(65) Prior Publication Data

US 2010/0054888 A1 Mar. 4, 2010

(30) Foreign Application Priority Data

Sep. 3, 2008 (TW) ................................ 97215871 U

(51) Int. Cl.
B23C 5/26 (2006.01)
B23B 31/02 (2006.01)
(52) U.S. Cl. ......... 409/234; 409/232; 409/141; 408/143
(58) Field of Classification Search .................. 409/232, 409/234, 141; 408/239 A, 143; 279/100, 279/101, 103, 102
See application file for complete search history.

(56) References Cited

U.S. PATENT DOCUMENTS

| 2,511,416 | A | * | 6/1950 | Rundorff | 279/89 |
| 4,325,664 | A | * | 4/1982 | Mori | 409/234 |
| 4,776,734 | A | * | 10/1988 | Buettiker et al. | 409/234 |
| 6,231,282 | B1 | * | 5/2001 | Yoneyama et al. | 409/234 |
| 6,739,810 | B2 | * | 5/2004 | Komine | 409/234 |
| 7,252,467 | B2 | * | 8/2007 | Miller | 409/233 |
| 2007/0031205 | A1 | * | 2/2007 | Guy | 409/234 |
| 2008/0124182 | A1 | * | 5/2008 | Ando et al. | 409/231 |
| 2008/0224424 | A1 | * | 9/2008 | Chen | 279/47 |
| 2012/0163936 | A1 | * | 6/2012 | Hecht | 409/234 |

FOREIGN PATENT DOCUMENTS

JP 07-096435 A * 4/1995

OTHER PUBLICATIONS

Machine Translation of JP 07-096435, which JP '435 was published on Apr. 1995.*

* cited by examiner

Primary Examiner — Erica E Cadugan
(74) Attorney, Agent, or Firm — William E. Pelton, Esq.; Cooper & Dunham LLP

(57) ABSTRACT

A cutter holder has a holder body and a sleeve. The holder body has a first end, a middle, an insert part and a mounting part. The insert part is formed on the first end. The mounting part is formed on the middle of the holder body and has an outer thread formed around the mounting part. The sleeve is mounted around the mounting part and has an inner thread, multiple screw holes and multiple setscrews. The inner thread is formed on an inner surface of the sleeve, is screwed with the outer thread of the mounting part. The screw holes are separately defined through the sleeve. The setscrews are mounted in the screw holes and abut the mounting part.

9 Claims, 7 Drawing Sheets

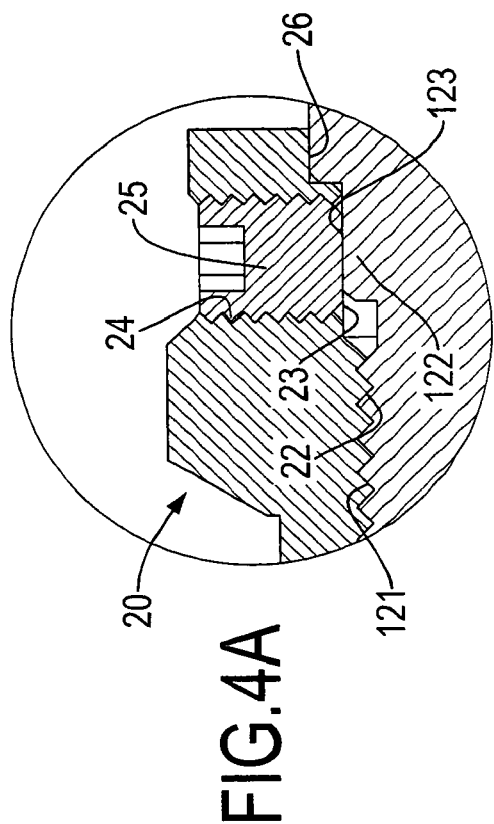
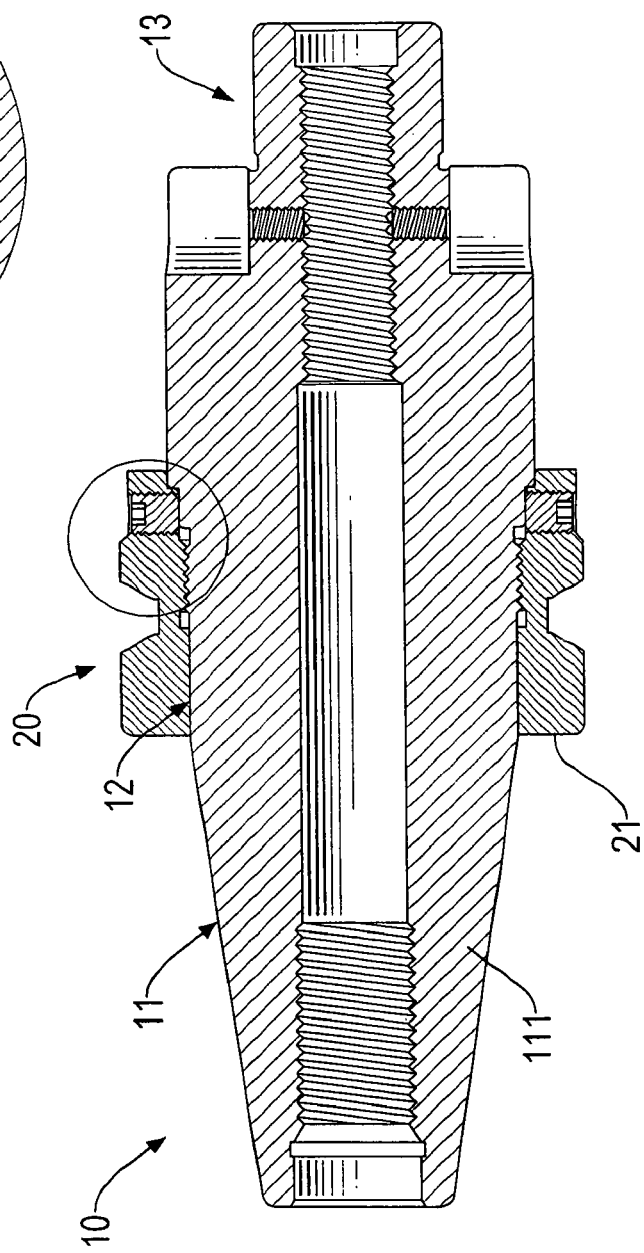
FIG.4A
FIG.4

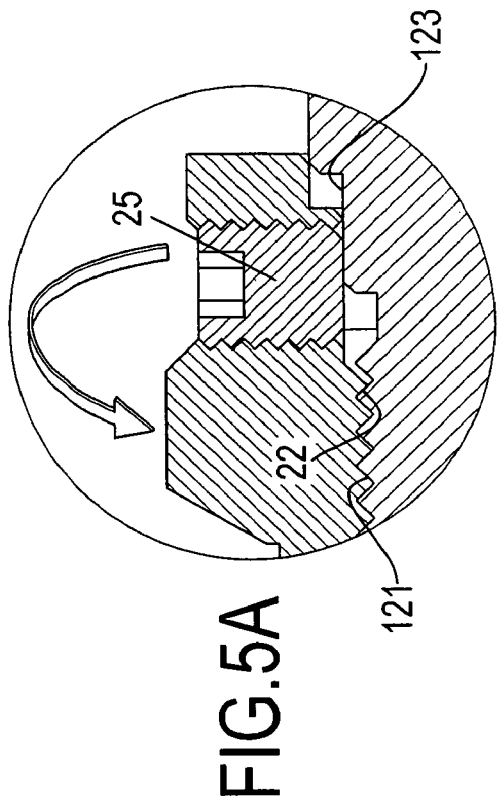
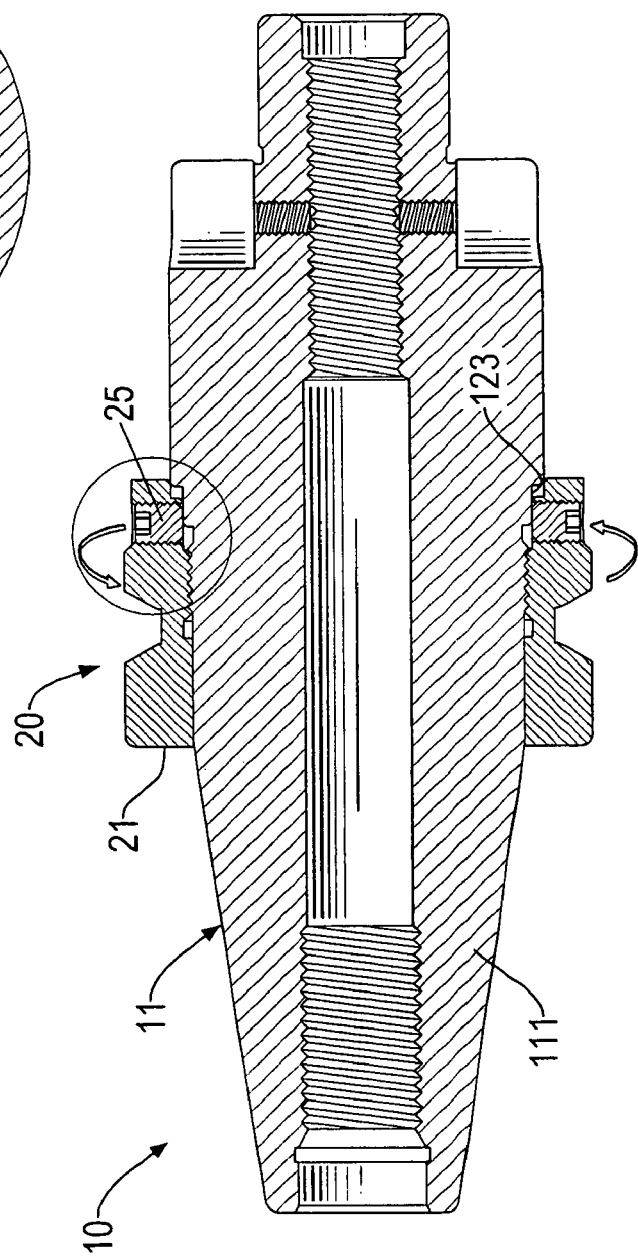

CUTTER HOLDER

BACKGROUND OF THE INVENTION

1. Field of the Invention

The present invention relates to a cutter holder, more particularly to a cutter holder having an adjustable sleeve to allow the cutter holder to be stably combined with a spindle stably.

2. Description of Related Art

A conventional cutter holder has a holder body and an annular flange. The holder body may be a shaft and has two ends, a middle, an insert part, a mounting part and a connecting part The insert part is formed on one of the ends of the holder body and may be a conical frustum. The mounting part is formed on the middle. The connecting part is formed on the other end, is opposite to the insert part and is connected with a cutter. The annular flange protrudes around the mounting part of the holder body.

When in use, the insert part is inserted into and abuts an inner surface of an insert hole of a spindle, the annular flange abuts a sidewall of the spindle to mount the holder body on the spindle stably and reduce vibrations during use.

However, forming the insert part to precisely match the insert hole of the spindle is very difficult so the insert part cannot be completely inserted into the spindle and a clearance is formed between the annular flange and the sidewall of the spindle. Since a position of the annular flange cannot be adjusted to abut against the sidewall of the spindle, the cutter holder will vibrate when in operation and thus decreases cutting precision.

To overcome the shortcomings, the present invention tends to provide a cutter holder to mitigate or obviate the aforementioned problems.

SUMMARY OF THE INVENTION

A cutter holder has a holder body and a sleeve. The holder body has a first end, a middle, an insert part and a mounting part. The insert part is formed on the first end. The mounting part is formed on the middle of the holder body and has an outer thread formed around the mounting part. The sleeve is mounted around the mounting part and has an inner thread, multiple screw holes and multiple setscrews. The inner thread is formed on an inner surface of the sleeve, is screwed with the outer thread of the mounting part. The screw holes are separately defined through the sleeve. The setscrews are mounted through the screw holes and abut the mounting part. Therefore, the cutter holder is stable in a spindle and hence decreases vibrations during use.

Other objects, advantages and novel features of the invention will become more apparent from the following detailed description when taken in conjunction with the accompanying drawings.

BRIEF DESCRIPTION OF THE DRAWINGS

FIG. 4 is an enlarged cross sectional side view of the cutter holder in FIG. 1;

FIG. 4A is an enlarged cross sectional side view in partial section of the cutter holder in FIG. 4;

FIG. 5 is an operational cross sectional side view of the cutter holder in FIG. 1, illustrating a sleeve being moved to a first end of a holder body;

FIG. 5A is an operational enlarged cross sectional side view in partial section of the cutter holder in FIG. 5;

DETAILED DESCRIPTION OF PREFERRED EMBODIMENT

Figure 7:
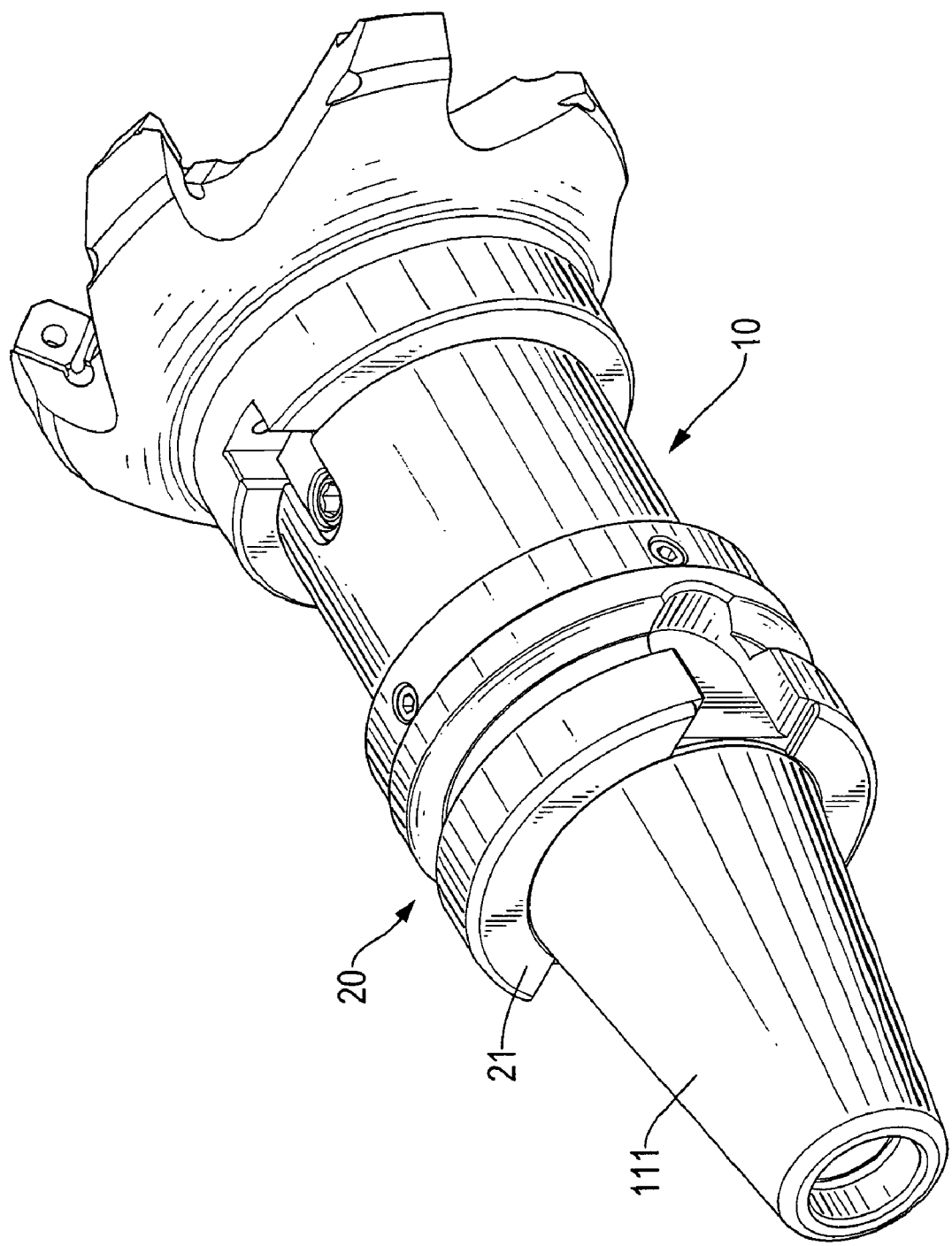
FIG. 7 is a perspective view of the cutter holder in FIG. 1 combined with a cutter.

With reference to FIGS. 1 to 4, a cutter holder in accordance with the present invention comprises a holder body (10) and a sleeve (20). The holder body (10) is a shaft and comprises a first end, a second end, a middle, an insert part (11), a mounting part (12) and a connecting part (13). The insert part (11) may be a conical frustum, is formed on the first end and comprises a distal end, a proximal end and a peripheral surface (111). The distal end has a diameter. The proximal end is opposite to the distal end and has a diameter. The diameter of the proximal end is larger than the diameter of the distal end. The peripheral surface (111) is formed around the insert part (11). The mounting part (12) is formed on the middle of the holder body (10), is connected with the proximal end of the insert part (11) and has a middle, an outer thread (121) and a lip (122). The outer thread (121) is formed around the middle of the mounting part (12). The lip (122) is formed on and protrudes from the mounting part (12) between the outer thread (121) and the second end of the holder body (10) and has an outer surface (123). The outer surface (123) is formed around the lip (122). With further reference to FIG. 7, the connecting part (13) is formed on the second end of the holder body (10) and is connected with a cutter.

The sleeve (20) is circular in cross section, is mounted around the mounting part (12) of the holder body (10) and has two ends, an inner surface, an abutting face (21), an inner thread (22), a connecting surface (23), multiple screw holes (24), multiple setscrews (25) and a holding recess (26). The abutting face (21) is formed on one of the ends of the sleeve (20) and faces the first end of the holder body (10). The inner thread (22) is formed in the inner surface of the sleeve (20) and is screwed with the outer thread (121) of the mounting part (12). The connecting surface (23) is annular, is defined in the inner surface of the sleeve (20) and abuts with the lip (122). The multiple screw holes (24) are separately defined radially through the sleeve (20) and four screw holes (24) may be implemented. The setscrews (25) are mounted in corresponding screw holes (24) and abut the outer surface (123) of the lip (122) to securely hold the sleeve (20) on the holder body (10). The holding recess (26) is formed in the end of the sleeve (20) that faces the second end of the holder body (10) and holds an end of the connecting part (13) of the holder body (10).

Figure 1:
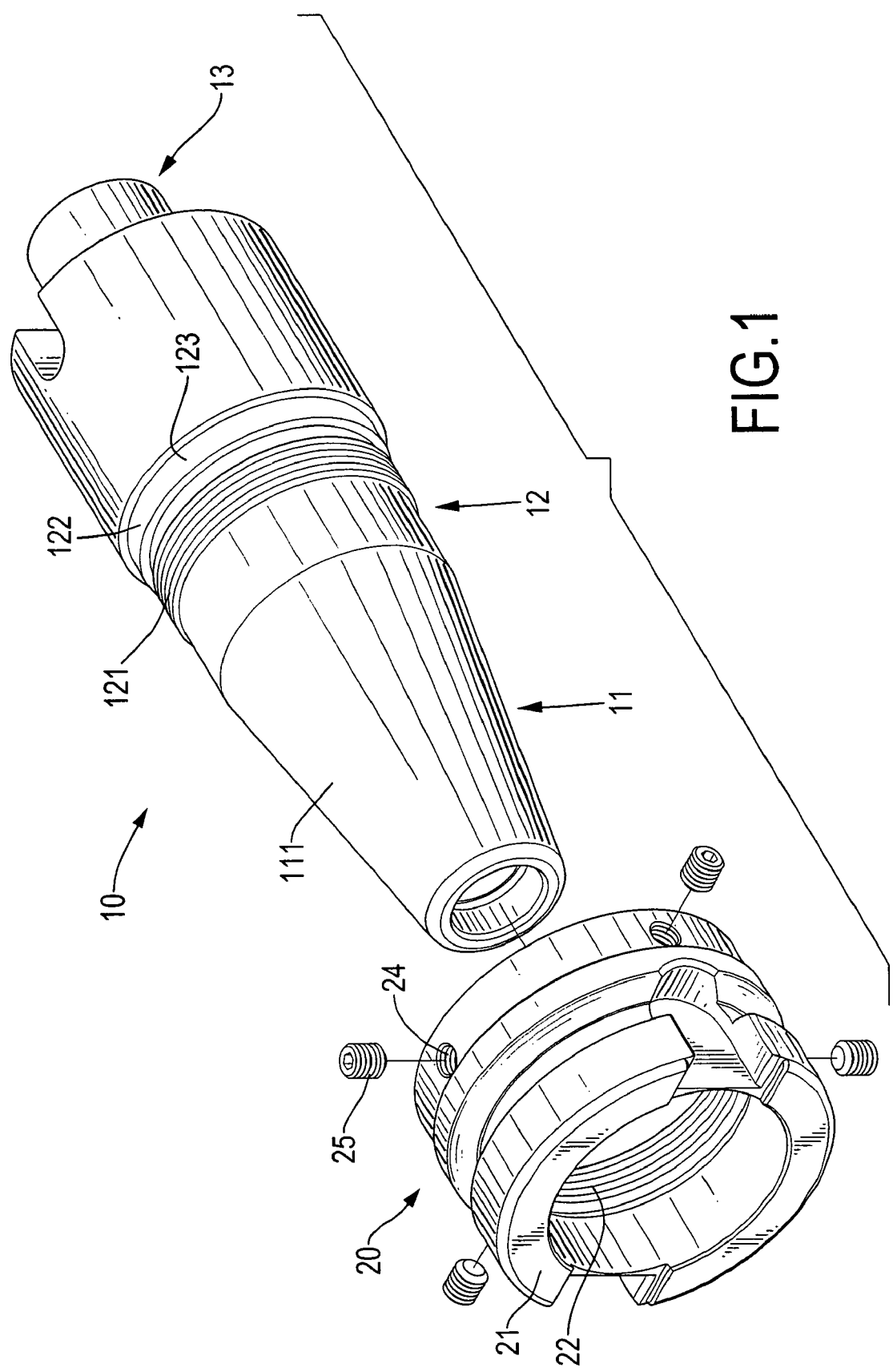
FIG. 1 is an exploded perspective view of the cutter holder in accordance with the present invention.
Figure 2:
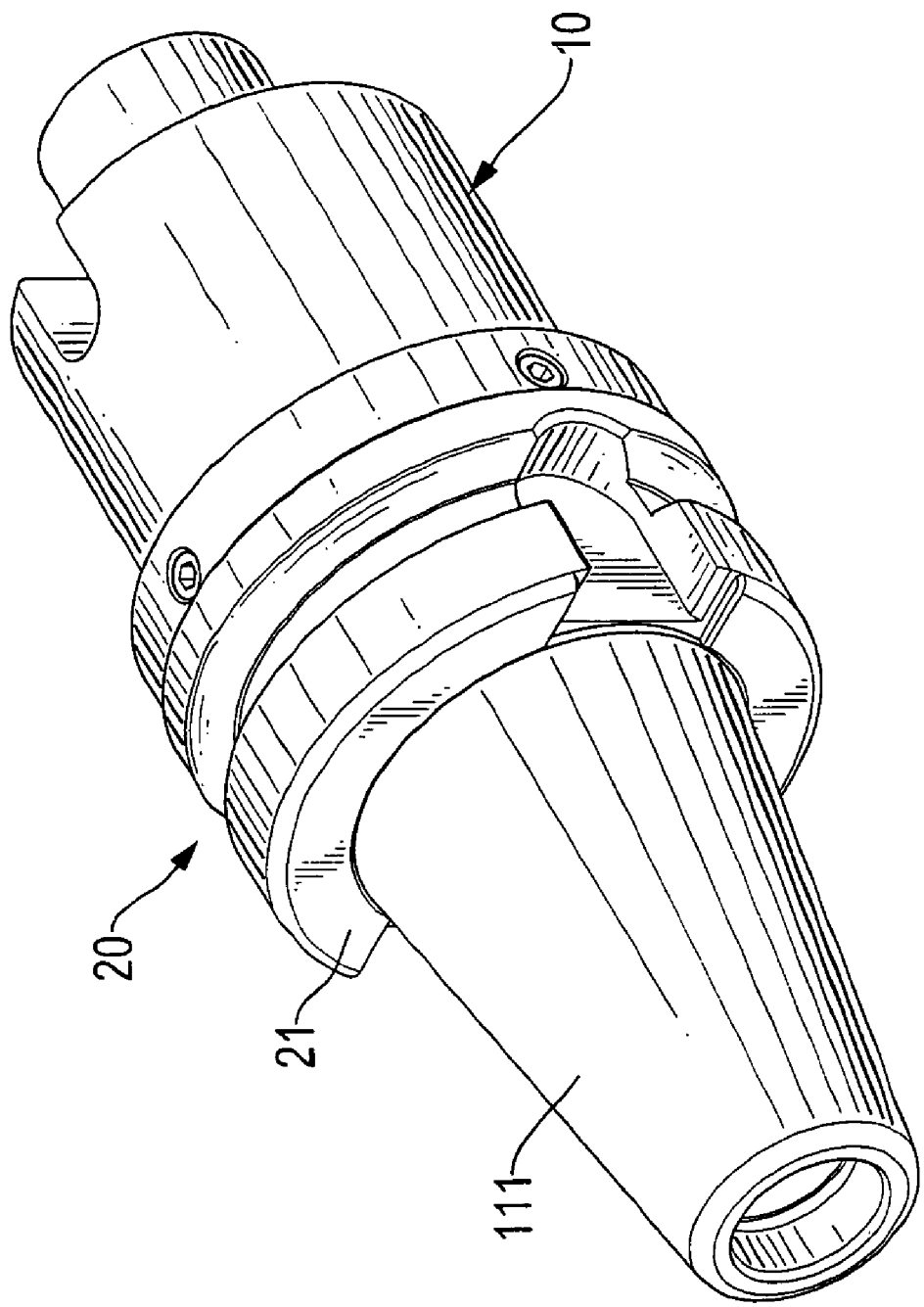
FIG. 2 is a perspective view of the cutter holder in FIG. 1.
Figure 3:
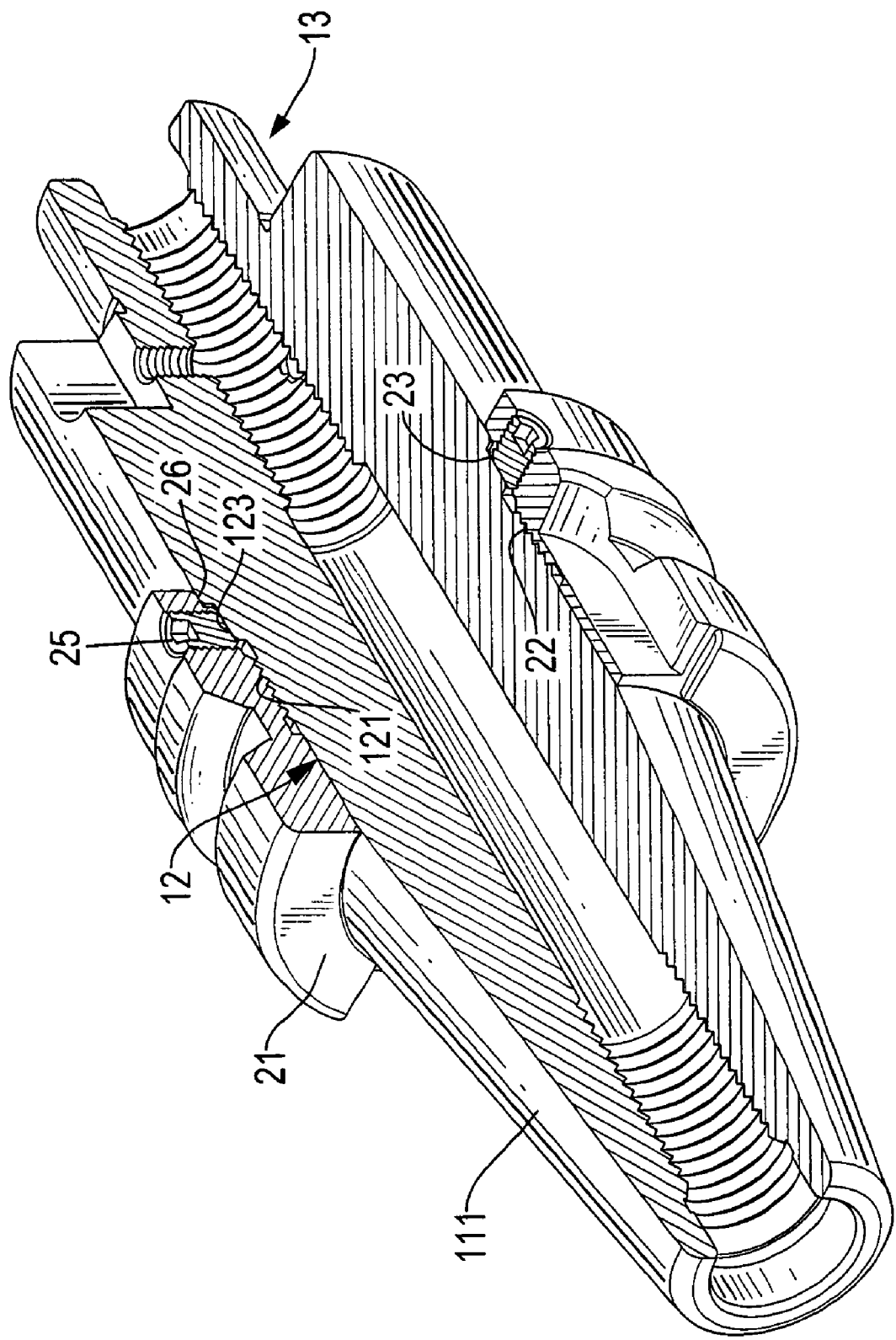
FIG. 3 is a partial sectional perspective view of the cutter holder in FIG. 1.
Figure 6:
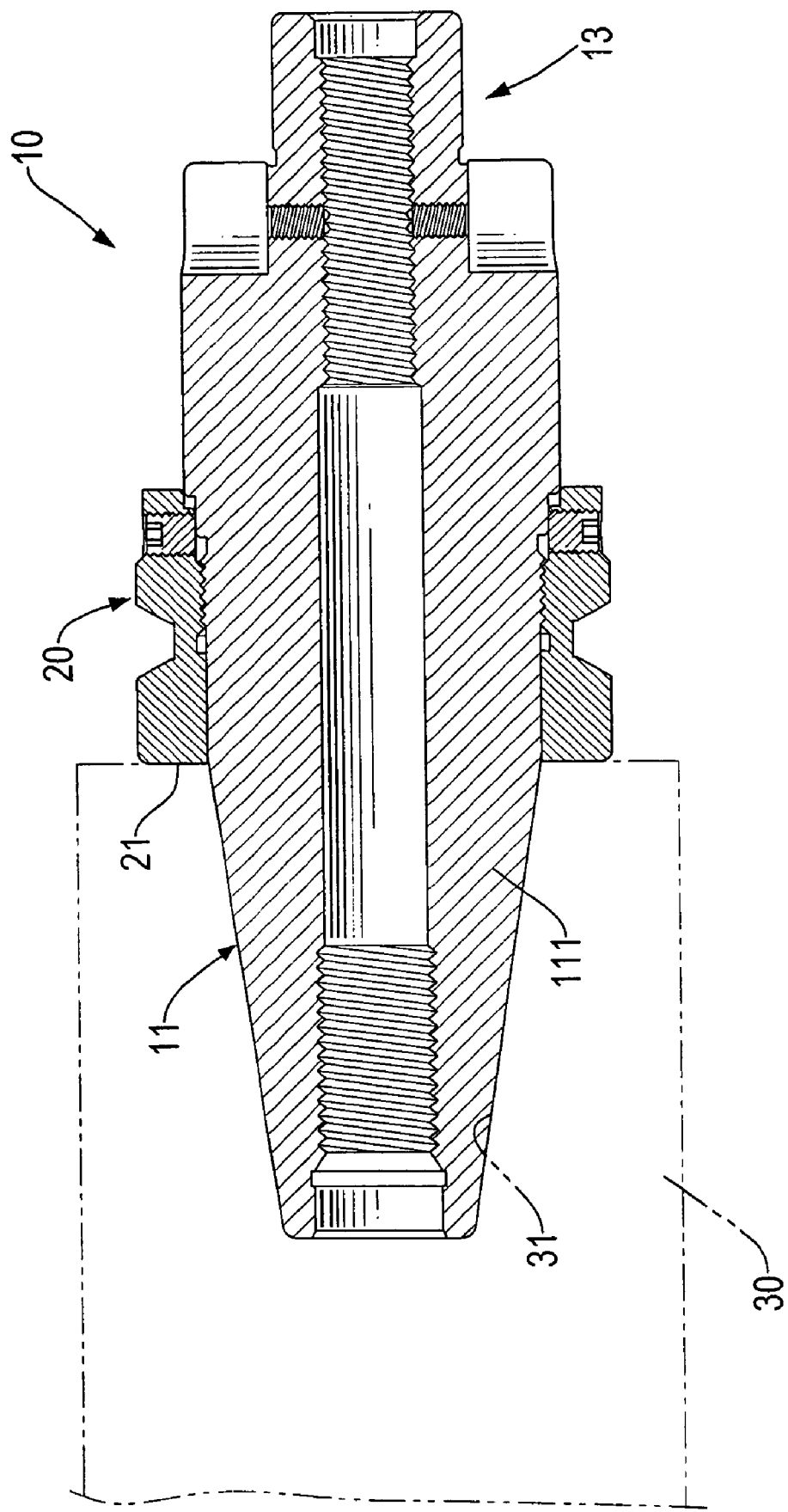
FIG. 6 is an operational cross sectional side view of the cutter holder in FIG. 1 combined with a spindle.

With reference to FIGS. 5 and 6, when the insert part (11) is inserted into an insert hole (31) of a spindle (30), but the abutting face (21) does not abut the sidewall of the spindle (30), the setscrews (25) can be released from the outer surface (123) to slidably adjust the sleeve (20) along the holder body (10). The sleeve (20) can be slid relative to the holder body (10) to make the mounting part (21) abut with the spindle (30). Then, the setscrews (25) are tightened to hold the 24 sleeve (20) securely at a required position. Because the required position of the sleeve (20) is adjustable, the insert part (11) can be mounted tightly in the insert hole (31) and the abutting face (21) abuts against the spindle (30). Consequently, the cutter holder of the present invention is stably combined with the spindle (30) to prevent vibration during use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutter holder configured for attachment to a rotary tool spindle, the cutter holder comprising:
    a holder body having:
        a first end;
        a second end;
        a middle;
        an insert part formed on the first end and having a conically-shaped peripheral surface configured for being inserted in and mated with a corresponding conically-shaped inner surface of the tool spindle;
        a mounting part formed on the middle of the holder body, connected with the insert part and having:
            an outer thread formed around the mounting part;
    the cutter holder also comprising a sleeve mounted around the mounting part of the holder part and having:
        two ends;
        an inner surface;
        an abutting face formed on one of the ends of the sleeve and facing the insert part and configured for abutting an end face of the tool spindle when the conical outer surface of the insert part is mated with the inner surface of the tool spindle when the sleeve is mounted around the mounting part;
        an inner thread formed in the inner surface of the sleeve and screwed with the outer thread of the mounting part to make the sleeve adjustable in position relative to the holder body;
        multiple screw holes separately defined through the sleeve;
        multiple setscrews mounted in corresponding screw holes and abutting the mounting part.

2. The cutter holder as claimed in claim 1, wherein the mounting part further has a middle around which the outer thread is formed;
    wherein a lip is formed on the mounting part between the outer thread and the second end of the holder body and has an outer surface formed around the lip, and the setscrews abut the outer surface of the lip; and
    the sleeve further has a connecting surface defined in the inner surface of the sleeve and abutting the lip.

3. The cutter holder as claimed in claim 2, wherein the sleeve further has a recess formed in the end of the sleeve that faces the second end of the holder body.

4. The cutter holder as claimed in claim 3, wherein the holder body further has a connecting part formed on the second end of the holder body and for connecting the holder body to a cutter.

5. The cutter holder as claimed in claim 4, wherein the insert part further has a distal end, distal with respect to the mounting part, having a diameter; and wherein the insert part also has a proximal end opposite to the distal end, having a diameter larger than the diameter of the distal end, and the mounting part is connected with the proximal end.

6. The cutter holder as claimed in claim 5, wherein the sleeve has four of the screw holes.

7. The cutter holder as claimed in claim 3, wherein the insert part further has a distal end, distal with respect to the mounting part, having a diameter; and wherein the insert part also has a proximal end opposite to the distal end, having a diameter larger than the diameter of the distal end, and the mounting part is connected with the proximal end.

8. The cutter holder as claimed in claim 2, wherein the insert part further has a distal end, distal with respect to the mounting part, having a diameter; and wherein the insert part also has a proximal end opposite to the distal end, having a diameter larger than the diameter of the distal end, and the mounting part is connected with the proximal end.

9. The cutter holder as claimed in claim 1, wherein the insert part has a distal end, distal with respect to the mounting part, having a diameter; and wherein the insert part also has a proximal end opposite to the distal end, having a diameter larger than the diameter of the distal end, and with which the mounting part is connected.

* * * * *